3,094,491
WAX-FREE PAINT REMOVER
George K. Greminger, Jr., Richard W. Swinehart, and Miles A. Weaver, Midland, Mich., assignors to The Dow Chemical Company, Midland, Mich., a corporation of Delaware
No Drawing. Filed Nov. 15, 1957, Ser. No. 696,626
3 Claims. (Cl. 252—171)

This invention relates to compositions that are useful for removing paint, varnish, and lacquer coatings, particularly to such compositions that are wax free.

This aplication is a continuation-in-part of U.S. Serial No. 394,474, filed November 25, 1953, and now abandoned.

Organic solvents and softeners have long been employed for removing paint, varnish, or lacquer coatings from wood, metal, and other surfaces. Those solvents are generally quite volatile and, when used alone, tend to evaporate before their solvating action can soften the coating. To overcome such objections, it has been proposed to employ paraffin, stearin, or other waxy substances as evaporation retardants to retard the evaporation of the solvent for the length of time required to soften the paint film. Those substances, however, leave a waxy coating on the substratum after the paint and paint remover have been removed by scraping or flushing. When a paint, varnish, or lacquer coating is reapplied to a surface having such a waxy coating, the newly applied coating will not adhere. Still another objection to the previously mentioned removers is that they are so fluid, that when applied to vertical surfaces, they drain off the surfaces before their full solvency effects on the paint may be realized. That requires repeated treatments to be applied which uses excessively large quantities of remover.

It is an object of this invention to provide a composition suitable for use in removing paint, varnish, and lacquer coatings, which coatings do not leave a waxy residue on the surface after the coatings have been removed.

It is a further object to provide a paint remover composition which will adhere to vertical surfaces.

The above and related objects are accomplished with a composition consisting of certain cellulose ethers as a thickener, certain organic solvents as the active paint removing components, and an evaporation retardant selected from the class consisting of mannitan stearate and sorbitan stearate.

The cellulose ethers which are useful as thickeners in the invention are those alkyl hydroxyalkyl cellulose ethers in which the alkyl group contains from 1 to 3 carbon atoms and the hydroxyalkyl group contains from 2 to 4 carbon atoms, and which melt at a temperature appreciably below their decomposition temperature and which are soluble in water and certain organic solvents. Such ethers as the methyl hydroxyethyl and methyl hydroxypropyl ethers of cellulose, when etherified to an extent as will be later described, are particularly useful.

The cellulose ethers may be prepared by known processes such as that described in the copending aplication of Albert B. Savage, U.S. Serial No. 432,921, filed May 27, 1954, now U.S. Patent No. 2,831,852. In the latter process, cellulose is treated with from 30 to 60 percent aqueous caustic soda solution to give an alkali cellulose with a NaOH/cellulose ratio from 0.7 to 1.5. The alkali cellulose is mixed with from 1.1 to 2.0 parts of the appropriate alkyl chloride per part of cellulose and with 0.45 to 0.50 parts of propylene oxide, or its molecular equivalent of ethylene oxide or butylene oxide, per part of cellulose at a temperature below 40° C. for a short time, followed by reaction at 60° C. or higher until etherification is substantially complete.

It is difficult to determine the proportions and amounts of each substituent in a mixed cellulose ether especially in one prepared in a single step reaction. It has been found that these operable ethers, when analyzed by the procedure disclosed by Lemieux and Purves in Canadian J. Research B–25, 485 (1947), contain from 28 to 32 percent alkyl substtiuents and from 7 to 12 percent hydroxyalkyl substituents. Such cellulose ethers are readily prepared by the previously described procedure. It is easier to characterize the ethers by some physical property, such as melting point of the ether or gel point of its water solutions. For use in this invention the cellulose ether thickener must be soluble in methylene chloride alone. Many cellulose ethers are soluble in the methylene chloride-methanol cosolvent employed in the prior known paint remover compositions, but methanol cannot be used in the compositions of this invention because of the solubility characteristics of the evaporation retardant employed. The above described cellulose ethers alone of the alkyl- or alkyl hydroxyalkyl celluloses have suitable properties and characteristics for use as thickeners in these compositions.

The useful cellulose ethers are further characterized by having gel points in water that are between those of alkyl celluloses and the commercial methyl hydroxypropyl cellulose. For example, the methyl celluloses of commerce have aqueous gel points from 45° to 50° C.,; the commercial methyl hydroxypropyl celluloses have aqueous gel points above 60° C., and the cellulose ethers of this invention have gel points of about 55° C.

The viscosity grades of the cellulose ethers which may be used in accordance with this invention may vary from 10 centipoises to 4000 centipoises, perferably from 400 centipoises to 4000 centipoises. The viscosity grade, by which cellulose ethers are sold comercially, indicates the average viscosity of a 2 percent aqueous solution when measured at 20° C.

The active paint removing component of the compositions is an organic solvent. Organic solvents which are useful in paint remover compositions are well-known in the art. Because non-flammable compositions are desirable, the preferred organic solvent is methylene chloride. Other well-known solvents such as ethyl lactate, ethyl acetate, and others may be employed as a diluent for the methylene chloride providing that such diluents are kept at a concentration below that imparting flammability to the composition.

Since most of the organic solvents that are useful in paint remover compositions are highly volatile, it is necessary to employ an agent to retard the rate of evaporation of the solvent for the time necessary for the solvent to soften the paint film. An evaporation retardant must function at the air-paint remover interface and to carry out that function the retardant should have limited solubility in the liquid vehicle of the remover composition. That solubility has been found to be between about 2 to 5 grams of retardant in 100 grams of remover vehicle measured at room temperature. When a material has greater or less solubility than the stated amount, it does not provide adequate retardation of evaporation of the active paint removing component and the solvent evaporates before it has a chance to soften the paint film sufficiently for effective removal. Under those conditions the paint removing operation must be repeated over and over to strip the painted surface of its coating. In the past, those agents have consisted of waxy substances such as paraffin and stearin. Such agents leave a residuum in the form a waxy film on the surface after the paint film has been removed. Because paints, lacquers, and varnishes do not adhere to such waxy surfaces, it has been necessary for a separate time-consuming step to remove the wax film before applying a fresh coating over the stripped surface. It has now been found that mannitan stearate and sorbitan stearate have the required solubility and may be used as evaporation retardants which do not leave a wax film on the surface. In the past it was almost universally accepted that when methylene chloride was employed as the active paint removing component, there was needed a significant amount of methanol as a co-solvent to provide suitable solvating power for the thickener and the evaporation retardant. The mannitan and sorbitan stearates of this invention, however, are too soluble in methanol for serving their expected function of retarding the evaporation of the methylene chloride. Eliminating methanol from the prior compositions upset the solubilities of the usual thickeners. As previously mentioned, it was found that only those alkyl hydroxyalkyl cellulose ethers described supra were operable in methylene chloride as the sole solvent.

Because of the methanol solubility of these retardants, however, methanol is an ideal material to flush off the remover and softened paint film. Water or other solvent may be used if desired.

The amounts of each ingredient that may be used will be determined by the properties desired in the resulting composition. Amounts of mannitan stearate or sorbitan stearate of from about 1 to 5 percent may be used. The cellulose ether may be employed in an amount of from 1 to 10 percent, and the organic solvent in amounts ranging from 85 to 98 percent. When it is desired to remove paint films from vertical surfaces larger amounts of cellulose ether are required to keep the solution from running off the surface at least until the desired time has elapsed for the organic solvent to soften the film. Also, when the compositions are to be employed in the tropics or other warm climates, it is necessary to employ larger quantities of mannitan stearate or sorbitan stearate to retard the rate of evaporation of the organic solvents. For general use, however, compositions prepared within the above-stated proportions are effective paint removers.

The compositions which are useful as paint removing substances will be more apparent from the following examples in which all parts are by weight.

*Example 1*

A composition was prepared consisting of 11 parts of a methyl hydroxypropyl cellulose prepared by the previously described method and containing 31.9 percent methyl substituents and 7.4 percent hydroxypropyl substituents, 240 parts of methylene chloride, and 3 parts of mannitan stearate. The mixture was stirred until a smooth dispersion was obtained.

The composition was an efficient paint remover leaving no wax residuum. The efficiency was unimpaired after a month storage. Identical results were obtained when sorbitan stearate was employed in place of mannitan stearate. In addition, the same results were noted when the methyl hydroxypropyl cellulose was replaced with methyl hydroxyethyl cellulose and ethyl hydroxyethyl cellulose.

By way of contrast, compositions similar to the above were prepared replacing the methyl hydroxypropyl cellulose with water-soluble methyl cellulose, organic-soluble methyl cellulose, water-soluble hydroxypropyl cellulose, water-soluble sodium carboxymethyl cellulose, water-soluble hydroxyethyl cellulose, water-soluble ethylmethyl cellulose, and water-soluble carboxymethyl hydroxyethyl cellulose. None of the compositions gave the desired thickening properties for the compositions to be used as paint removers on vertical surfaces.

By way of further contrast compositions were prepared replacing the mannitan stearate with sorbitan monopalmitate, sorbitan monooleate, sorbitan trioleate, glyceryl laurate, glyceryl monostearate, propylene glycol stearate, pentaerythritol stearate and trihydroxyethylamine stearate. In each case the methylene chloride evaporated before the paint was sufficiently softened for effective removal.

We claim:
1. A paint, lacquer, and varnish remover composition consisting essentially of (a) from 1 to 10 percent by weight of a water-soluble alkyl hydroxyalkyl cellulose in which said hydroxyalkyl group contains from 2 to 4 carbon atoms and is present in said alkyl hydroxyalkyl cellulose in an amount of from 7 to 12 percent and in which said alkyl group contains from 1 to 3 carbon atoms and is present in said alkyl hydroxyalkyl celluose in an amount of from 28 to 32 percent; (b) from 85 to 98 percent of a solvent consisting essentially of methylene chloride; and (c) from 1 to 5 percent of an evaporation retardant selected from the class consisting of mannitan stearate and sorbitan stearate.

2. The coating remover composition as defined in claim 1 in which the cellulose ether is methyl hydroxypropyl cellulose.

3. The coating remover composition as defined in claim 1 wherein the solvent is methylene chloride.

References Cited in the file of this patent

UNITED STATES PATENTS

| | | |
|---|---|---|
| 2,190,451 | Haskins | Feb. 13, 1940 |
| 2,207,967 | Bland et al. | July 16, 1940 |
| 2,380,166 | Griffin | July 10, 1945 |
| 2,388,764 | Reichel et al. | Nov. 13, 1945 |
| 2,827,439 | Helper et al. | Mar. 18, 1958 |
| 2,831,852 | Savage | Apr. 22, 1958 |
| 2,835,666 | Savage | May 20, 1958 |
| 2,949,452 | Savage | Aug. 16, 1960 |

FOREIGN PATENTS

| | | |
|---|---|---|
| 361,217 | Great Britain | Nov. 19, 1931 |
| 485,857 | Great Britain | May 20, 1938 |

OTHER REFERENCES

Methocel, pp. 21—22, pub. by Dow Chemical Co., Midland, Mich. (1949).

Atlas Surface Active Agents, table I, p. 25, pub. by Atlas Powder Co., Wilmington, Del., September 1950.

"Modocoll Water-Soluble Cellulose Ethers," Mo Och Domsjo Aktiebolag, Sweden (July 1952), pp. 5 and 6.